United States Patent
Li et al.

(10) Patent No.: US 10,098,003 B2
(45) Date of Patent: Oct. 9, 2018

(54) ACCESS NODE, A COMMUNICATION DEVICE, RESPECTIVE METHOD PERFORMED THEREBY FOR CARRIER HOPPING

(71) Applicant: Telefonaktiebolaget L M Ericsson (publ), Stockholm (SE)

(72) Inventors: Gen Li, Beijing (CN); Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 14/420,929

(22) PCT Filed: Jun. 3, 2014

(86) PCT No.: PCT/CN2014/079073
§ 371 (c)(1),
(2) Date: Feb. 11, 2015

(87) PCT Pub. No.: WO2015/184583
PCT Pub. Date: Dec. 10, 2015

(65) Prior Publication Data
US 2016/0249222 A1    Aug. 25, 2016

(51) Int. Cl.
*H04B 1/713* (2011.01)
*H04W 16/14* (2009.01)

(52) U.S. Cl.
CPC ............ *H04W 16/14* (2013.01); *H04B 1/713* (2013.01)

(58) Field of Classification Search
CPC . H04W 16/14; H04W 40/12; H04W 72/0446; H04L 5/001; H04L 5/0098; H04L 43/16
See application file for complete search history.

(56) References Cited

U.S. PATENT DOCUMENTS

| 8,374,212 | B2 | 2/2013 | Charbit et al. | |
|---|---|---|---|---|
| 2008/0298450 | A1* | 12/2008 | Zhang | H04L 1/0006 375/227 |
| 2011/0103341 | A1* | 5/2011 | Ko | H04B 7/0669 370/329 |
| 2011/0268008 | A1* | 11/2011 | Kim | H04W 4/001 370/312 |
| 2013/0165134 | A1 | 6/2013 | Touag et al. | |

(Continued)

FOREIGN PATENT DOCUMENTS

| CN | 101268707 A | 9/2008 |
|---|---|---|
| CN | 102812772 A | 12/2012 |

(Continued)

OTHER PUBLICATIONS

PCT Notification Concerning Transmittal of International Preliminary Report on Patentability (Chapter 1 of the Patent Cooperation Treaty) (PCT Rule 44bis.1(c)), International Application No. PCT/CN2014/079073, 7 pages, dated Dec. 15, 2016.

(Continued)

*Primary Examiner* — Phong La
(74) *Attorney, Agent, or Firm* — Baker Botts LLP

(57) ABSTRACT

An access node, a communication device, methods performed thereby and a computer readable storage medium for carrier hopping are provided. A method of carrier hopping for an access node of a wireless communication network is provided. The access node operates on a first carrier in an unlicensed band. The method comprises: determining whether a hopping triggering condition is satisfied; and in response to determining that the hopping triggering condition is satisfied, activating a carrier hopping procedure to a second different carrier in the unlicensed band.

28 Claims, 7 Drawing Sheets

(56) References Cited

U.S. PATENT DOCUMENTS

| | | | |
|---|---|---|---|
| 2014/0004845 A1* | 1/2014 | Marque-Pucheu | H04W 52/243 455/422.1 |
| 2014/0044027 A1* | 2/2014 | Beale | H04W 56/00 370/311 |
| 2014/0064227 A1 | 3/2014 | Zhang et al. | |
| 2014/0185497 A1* | 7/2014 | Wolf | H04W 28/26 370/294 |
| 2015/0065152 A1* | 3/2015 | Sadek | H04W 72/0453 455/450 |
| 2015/0085792 A1* | 3/2015 | Reddy | H04L 5/0098 370/329 |
| 2015/0156636 A1* | 6/2015 | Tabet | H04W 16/14 370/329 |
| 2015/0222410 A1* | 8/2015 | Belghoul | H04W 28/085 370/252 |
| 2015/0264702 A1* | 9/2015 | Yang | H04W 72/0453 455/452.1 |

FOREIGN PATENT DOCUMENTS

| | | |
|---|---|---|
| KR | 10-2014-0022383 | 9/2012 |
| WO | 00/41429 A1 | 7/2000 |
| WO | 2013/131268 A1 | 9/2013 |
| WO | WO 2013/131268 A1 | 9/2013 |

OTHER PUBLICATIONS

Korean Intellectual Property Office, Korean Patent Application No. 10-2016-7033888, Notice of Preliminary Rejection, First Office Action along with English Summary of First Office Action and English Google translation of Korean Office Action, 14 total pages, dated May 18, 2017.

European Telecommunications Standards Institute (ETSI), "Reconfigurable Radio Systems (RRS); Use cases for Operation in White Space Frequency Bands", Draft ETSI TR 102 907 V0.0.9 Technical Report, Jan. 31, 2011, 54 pages.

European Patent Office Communication, Supplementary European Search Report, and Annex to the European Search Report for European Application No. EP 14 89 4047.1-1874, dated Dec. 11, 2017, 8 pages.

Korean Intellectual Property Office, Notice of Allowance (with English translation), Patent Application No. 10-2016-7033888, dated Dec. 22, 2017.

* cited by examiner

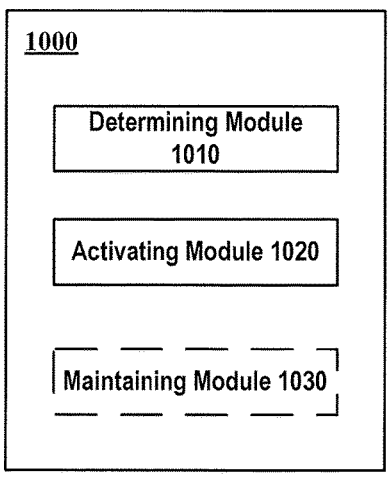
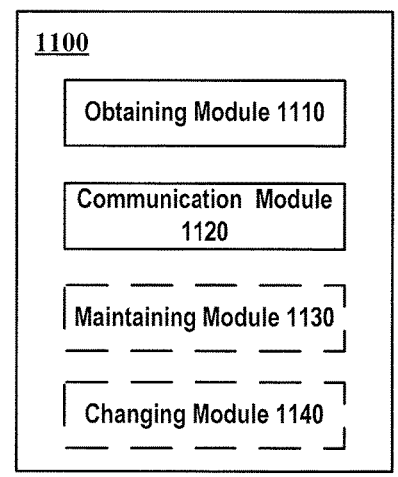
FIG. 10
FIG. 11
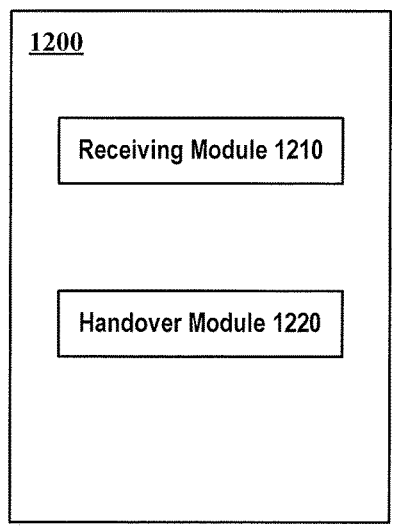
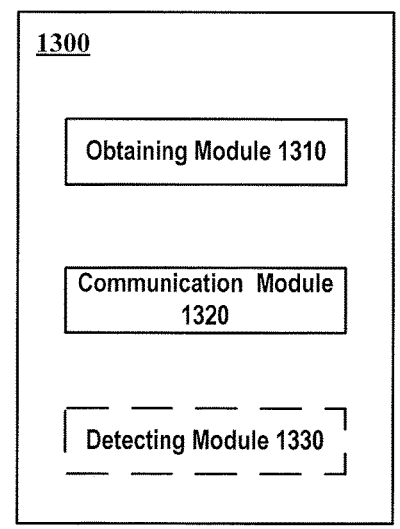
FIG. 12
FIG. 13

ACCESS NODE, A COMMUNICATION DEVICE, RESPECTIVE METHOD PERFORMED THEREBY FOR CARRIER HOPPING

PRIORITY

This nonprovisional application is a U.S. National Stage Filing under 35 U.S.C. § 371 of International Patent Application Serial No. PCT/CN2014/079073 filed Jun. 3, 2014, and entitled "AN ACCESS NODE, A COMMUNICATION DEVICE, RESPECTIVE METHOD PERFORMED THEREBY FOR CARRIER HOPPING".

TECHNICAL FIELD

Embodiments of the present disclosure generally relate to a wireless communication system and more particularly to, an access node, a communication device, respective method performed thereby, and a computer readable storage medium for carrier hopping.

BACKGROUND

This section introduces aspects that may facilitate a better understanding of the disclosure(s). Accordingly, the statements of this section are to be read in this light and are not to be understood as admissions about what is in the prior art or what is not in the prior art.

With development of wireless communication, billions of devices will be served via wireless connections for various services. Most of them are located at indoor scenario. For instance, it is very common to have several wireless devices at home and more than half of a hundred in an office floor or a conference room (e.g. cellular phone, tablet computer, smart television and etc.). In future, there will also be much more numbers of indoor devices who have needs to be served by a wireless connection to achieve the vision of connected world. Currently, wireless fidelity (WiFi) technology is the dominant wireless indoor access technology. As well-known, the WiFi performance will be degraded severely with an increasing number of active users due to frequent collisions resulted from contention-based Media Access Control (MAC). The spectrum efficiency of WiFi technology is usually less than Long Term Evolution (LTE) technology.

For the time being, companies have been proposing to run LTE over unlicensed bands by aggregating licensed and unlicensed band. As is known, 2.4 GHz and 5 GHz are the main unlicensed bands for WiFi systems currently. Since 2.4 GHz is already very crowded, 5 GHz may be a promising focus for LTE systems. Band at 5 GHz is usually divided into a multitude of channels. Countries apply their own regulations on allowable channels, allowed users and maximum power levels within these frequency ranges. The detailed channelization for different countries can be found in the following address: http://en.wikipedia.org/wiki/List_of_WLAN_channels.

From the list of Wireless Local Area Network (WLAN) channels, the channel bandwidth for WiFi channel is either 10 MHz or 20 MHz, which is coincidently aligned with that for LTE systems. More important, there are multiple orthogonal channels available in each country. For one particular WiFi access point (AP), it normally uses one or several of them (channel bundling) and does not use all of them. Thus status (e.g. load situation, interference) of different channels change in different time and place can be different.

All WiFi network equipments, including terminal devices and APs (e.g. routers), communicate over specific channels. Similar to that of a traditional television, each WiFi channel is designated by a number that represents a specific radio communication frequency bandwidth.

There are two different methods for channel selection in WiFi, i.e. automatically and manually. Both of them are always available for user configuration on WiFi routers. Operating system and utility software on WiFi routers keep track of WiFi channel settings being used at any given time. Under normal conditions, users don't need to worry about these settings. However, users and administrators may wish to change their Wi-Fi channel numbers in certain situations. Channel use is up to user behaviour and the status is not easy to predict. In other words, the channel may be free at one time and busy in another time.

There are large unlicensed bandwidths in 2.4 GHz and 5 GHz. Operators and vendors show strong interest in running LTE over these bands. However, mechanisms to run LTE over unlicensed band are not determined yet.

U.S. Pat. No. 8,374,212B2 discloses a frequency hopping method for radio resource control (RRC) signalling which is used to configure a user device for N secondary cells SCells on license-exempt channels in a frequency hopping channel. Then cross-carrier scheduling is sent on a primary cell PCell to schedule a frequency hopping resource block on the i-th license-exempt channel.

The current proposals for LTE over unlicensed bands mainly focus to aggregate licensed carriers and unlicensed carriers, and unlicensed carriers can be probably only used as secondary carriers. For example, frequency hopping signaling is proposed in U.S. Pat. No. 8,374,212B2 for configuring a user device for secondary cells on unlicensed bands. The following problems exist for such carrier aggregation based solution:

First, LTE cannot run over unlicensed carrier without licensed carrier support, and carrier aggregation is a mandatory feature for both evolved Node B (eNB) and user equipment (UE). This means complexity in both UE and eNB sides.

Second, if such an eNB is used for local access (e.g., at home, company), LTE users cannot access public data network (PDN) over unlicensed carriers via the eNB without paying to mobile operator due to mandatory licensed carrier. This means that such eNB is mainly developed to increase operator revenue rather than to serve as an access node for private local access. From this perspective, it is probably still less competitive than WiFi AP for private local access in home, office, shop, theatre, stadium, restaurant, hotel etc.

SUMMARY

Considering further in future, standalone LTE in an unlicensed band can be a good candidate for local indoor access technology to compete against WiFi in order to improve the total spectrum efficiency in the unlicensed band. Therefore, how to achieve constructive sharing for standalone LTE systems with WiFi systems in an unlicensed band becomes an important problem to be solved.

Thus, it would be desirable in the art to provide a new mechanism for a wireless communication system such as an LTE system to run over pure unlicensed bands, i.e. without aggregated with licensed frequency bands.

In a first aspect of the disclosure, a method of carrier hopping for an access node of a wireless communication network is provided. The access node operates on a first carrier in an unlicensed band. The method comprises: determining whether a hopping triggering condition is satisfied; and in response to determining that the hopping triggering condition is satisfied, activating a carrier hopping procedure to a second different carrier in the unlicensed band.

In some embodiments, the carrier hopping procedure may include a transition period, during which the access node operates on both the first carrier and the second carrier.

In further embodiments, the hopping triggering condition may comprise one or more of the following: a traffic load caused by other access node on the first carrier exceeding a first threshold; a retransmission rate of the access node on the first carrier exceeding a rate threshold; and a traffic load caused by other access node on the second carrier being lower than a second threshold and that the first carrier has been taken by the access node for a period longer than a time threshold.

In yet further embodiments, the carrier hopping procedure may comprise at least one of, during the transition period: informing a connected communication device to hand over to the second carrier; adding the second carrier into an inter-frequency measurement list broadcasted through a broadcast signaling, and reducing downlink transmission power on the first carrier gradually while increasing downlink transmission power on the second carrier; and configuring the first carrier as a barred carrier to indicate a new coming communication device not to select the first carrier.

Alternatively, in some embodiments, the carrier hopping procedure may comprise, during the transition period, broadcasting a carrier hopping command indicating the second carrier.

In some embodiments, the method may further comprise maintaining a set of candidate hopping carriers from which the second carrier is selected. The candidate hopping carriers are chosen based on traffic loads on carriers in the unlicensed band.

In further embodiments, maintaining the set may comprise one or more of the following: adding a carrier into the set if the traffic load on the carrier is lower than a third threshold; removing a carrier from the set if the traffic load on the carrier is higher than a fourth threshold; and ranking carriers in the set according to their respective traffic loads.

In some embodiments, the traffic load on a carrier may include at least one of the following: an occupation time by other access node during a monitoring window of the carrier; and an average received power level from other access node during a monitoring window of the carrier.

In a second aspect of the disclosure, a method of carrier hopping for an access node of a wireless communication network is provided. The method comprises: obtaining a carrier hopping pattern which defines a virtual carrier consisted of multiple carriers in an unlicensed band that are arranged in a consecutive and non-overlapping manner in time; and communicating with a communication device of the wireless communication network according to the carrier hopping pattern.

In some embodiments, the multiple carriers may include at least a main carrier and a secondary carrier, the main carrier being configured for carrying first information for a communication device to access the wireless communication network over the virtual carrier and second information about the carrier hopping pattern.

In some further embodiments, in the carrier hopping pattern, each of the multiple carriers may be arranged in units of subframe.

In some embodiments, the method may further comprise changing the carrier hopping pattern, wherein the main carrier is kept unchanged, or the main carrier is changed to a target carrier via a transition period, during which the access node transmits the first information and the second information on both the main carrier and the target carrier.

In some embodiments, the access node may be a radio base station of a long term evolution, LTE, system.

In a third aspect of the disclosure, a method of carrier hopping for a communication device of a wireless communication network is provided. The communication device communicates with an access node of the wireless communication network on a first carrier in an unlicensed band. The method comprises: receiving from the access node a carrier hopping command indicating a second different carrier in said unlicensed band; and handing over to the second carrier.

In some embodiments, the access node may be a radio base station of a long term evolution, LTE, system, and the communication device may be a user equipment of the LTE system.

In a fourth aspect of the disclosure, a method of carrier hopping for a communication device of a wireless communication network is provided. The method comprises: obtaining a carrier hopping pattern which defines a virtual carrier consisted of multiple carriers in an unlicensed band that are arranged in a consecutive and non-overlapping manner in time; and communicating with an access node of the wireless communication network according to said carrier hopping pattern.

In some embodiments, the multiple carriers may include at least a main carrier and a secondary carrier, the main carrier being configured for carrying first information for a communication device to access the wireless communication network over the virtual carrier and second information about the carrier hopping pattern.

In some further embodiments, in the carrier hopping pattern, each of the multiple carriers may be arranged in units of subframe.

In some embodiments, the method may further comprise: detecting a new carrier hopping pattern; and communicating with the access node according to the new carrier hopping pattern.

In some embodiments, the access node may be a radio base station of a long term evolution, LTE, system, and the communication device may be a user equipment of the LTE system.

In a fifth aspect of the disclosure, an access node of a wireless communication network is provided. The access node operates on a first carrier in an unlicensed band. The access node comprises a processor and a memory, the memory containing instructions executable by the processor whereby the access node is operative to determine whether a hopping triggering condition is satisfied; and in response to determining that the hopping triggering condition is satisfied, activate a carrier hopping procedure to a second different carrier in the unlicensed band.

In a sixth aspect of the disclosure, an access node of a wireless communication network is provided. The access node comprising a processor and a memory, the memory containing instructions executable by the processor whereby the access node is operative to obtain a carrier hopping pattern which defines a virtual carrier consisted of multiple carriers in an unlicensed band that are arranged in a consecutive and non-overlapping manner in time; and communicate with a communication device of the wireless network according to the carrier hopping pattern.

In a seventh aspect of the disclosure, a communication device of a wireless communication network is provided. The communication device communicates with an access node of the wireless communication network on a first carrier in an unlicensed band. The communication device comprises a processor and a memory, the memory containing instructions executable by the processor whereby the communication device is operative to: receive from the access node a carrier hopping command indicating a second different carrier in the unlicensed band; and hand over to the second carrier.

In an eighth aspect of the disclosure, a communication device of a wireless communication network is provided. The communication device comprises a processor and a memory, the memory containing instructions executable by the processor whereby the communication device is operative to: obtain a carrier hopping pattern which defines a virtual carrier consisted of multiple carriers in an unlicensed band that are arranged in a consecutive and non-overlapping manner in time; and communicate with an access node of the wireless communication network according to said carrier hopping pattern.

In a ninth aspect, a non-transitory computer-readable storage media having computer program code stored thereon is provided. The computer program code is configured to, when executed, cause an apparatus to perform actions in the method according to any of the first, second, third, and fourth aspects as above described.

It should be noted that, corresponding embodiments of the first aspect are also applicable for the fifth aspect. Similarly, corresponding embodiments of the second aspect are also applicable for the sixth aspect, corresponding embodiments of the third aspect are also applicable for the seventh aspect, and corresponding embodiments of the fourth aspect are also applicable for the eighth aspect.

Particular embodiments of the subject matter described in this specification can be implemented so as to realize one or more of the following advantages.

With the dynamic carrier hopping feature over an unlicensed band, the spectrum efficiency of the unlicensed band can be improved. It is most meaningful for wireless communication system such as LTE system over pure unlicensed carriers. It improves the carrier hopping capability of LTE over pure unlicensed frequencies so that LTE systems and WiFi systems can co-exist better in terms of resource sharing.

Other features and advantages of the embodiments of the present disclosure will also be understood from the following description of specific embodiments when read in conjunction with the accompanying drawings, which illustrate, by way of example, the principles of embodiments of the present disclosure.

BRIEF DESCRIPTION OF THE DRAWINGS

The above and other aspects, features, and benefits of various embodiments of the disclosure will become more fully apparent, by way of example, from the following detailed description and the accompanying drawings, in which:

FIG. 10 is a schematic block diagram of an access node that may be configured to practice exemplary embodiments according to the first embodiment of the present disclosure;

FIG. 11 is a schematic block diagram of an access node that may be configured to practice exemplary embodiments according to the second embodiment of the present disclosure;

FIG. 12 is a schematic block diagram of a communication device that may be configured to practice exemplary embodiments according to the first embodiment of the present disclosure; and FIG. 13 is a schematic block diagram of a communication device that may be configured to practice exemplary embodiments according to the second embodiment of the present disclosure.

Like reference numbers and designations in the various drawings indicate like elements.

DETAILED DESCRIPTION

Figure 1:
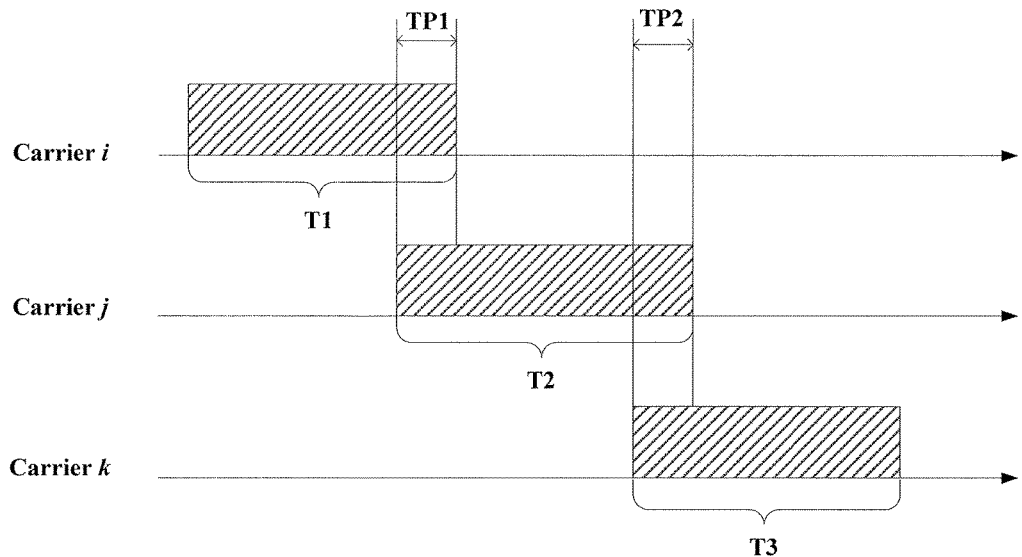
FIG. 1 illustrates a schematic diagram for a carrier hopping procedure according to a first embodiment of the present disclosure.

Hereinafter, the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

While it is described below in the context of an LTE type wireless network for illustrative purposes and since it happens to be well suited to that context, those skilled in the art will recognize that the disclosure disclosed herein can also be applied to various other types of wireless communication networks.

In the following description, an access node may be any network node intended for connecting a communication device to an access network. The access node may be a radio base station (RBS) of an LTE system. A base station (BS) is an entity for allocating resources to a terminal and can be any of an enhanced Node B (eNB), a Node B, a BS, a radio access unit, a base station controller, and a node on a network. Further, in the context of this disclosure, the cell or sector can be used interchangeable with a BS. A communication device may be any device intended for accessing services via an access network and configured to communicate over the access network. For instance, the communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or personal computer (PC). The communication device may be a portable, pocket-storable, hand-held, computer-comprised, or vehicle-mounted mobile device, enabled to communicate voice and/or data, via a wireless or wireline connection. In some embodiments, the communication device may be a user equipment (UE) of an LTE system. Carrier hopping means switching a carrier among many frequency channels, and thus it can be interchangeable referred to as channel hopping, frequency hopping, etc. An unlicensed band may refer to one or more unlicensed bands consisted of a plurality of unlicensed carriers.

Carrier hopping involves mobility control. As known, in an LTE system, mobility control for a UE in radio resource control IDLE (RRC_IDLE) state is UE-controlled (i.e. cell-reselection) according to predefined rules; while a UE in RRC_CONNECTED state, it is controlled by the Evolved-Universal Terrestrial Radio Access Network (E-UTRAN) (i.e. handover).

For a UE in RRC_IDLE state, cell reselection between frequencies (or interchangeably, channels, carriers) is based on predetermined or configured priorities, where each frequency has an associated priority. Cell-specific default values of the priorities are provided via system information (SI). In addition, the E-UTRAN may assign UE specific values upon connection release, taking into account factors such as UE capability or subscriber type. In case equal priorities are assigned to multiple cells, the cells are ranked based on radio link quality. Equal priorities are not applicable between frequencies of different radio access technologies (RATs). The UE does not consider frequencies for which it does not have an associated priority; this is useful in situations such as when a neighbouring frequency is applicable only for UEs of one of the sharing networks.

For a UE in RRC_CONNECTED state, the E-UTRAN decides to which cell a UE should hand over in order to maintain the radio link. As a UE is in RRC_CONNECTED state, the E-UTRAN may take into account not only the radio link quality but also factors such as UE capability, subscriber type and access restrictions. Although the E-UTRAN may trigger handover without measurement report from UE (blind handover), normally it configures the UE to report measurements of the candidate target cells.

Thus, with respect to UEs in different states, the proposed dynamic carrier hopping may be intended to enable UEs in various states to communicate with an access node of a wireless communication network via a carrier involved in carrier hopping. Specifically, one or more of the flowing requirements would be followed: new coming communication devices shall be able to access the carrier involved in carrier hopping; and both connected and idle communication devices can hop to the carrier involved in carrier hopping according to configuration by the access node when necessary.

In the present disclosure, two methods of dynamic carrier hopping for a wireless communication network in pure unlicensed bands are proposed.

FIG. 1 illustrates a schematic diagram for a carrier hopping procedure according to a first embodiment of the present disclosure.

The method according to the first embodiment is intended to keep the wireless communication system located in each carrier for a long enough time to ensure a communication device of the wireless communication system can access the system. Also, a carrier hopping procedure with a transition period is applied to ensure all connected communication devices can smoothly hop from a current operating carrier to a next carrier by reusing existing procedures (e.g., handover). Such method can be referred to as "slow soft carrier hopping" or "soft carrier hopping".

As shown in FIG. 1, during time period T1, the communication system operates on Carrier i; during time period T2, the communication system operates on Carrier j; while during time period T3, the communication system operates on Carrier k. These periods can be referred to as an active period for respective carrier. There is an overlap period, transition period TP1, between the time periods T1 and T2, during which the communication system operates on both Carrier i and Carrier j. Also, there is an overlap period, transition period TP2, between the time periods T2 and T3, during which the communication system operates on both Carrier j and Carrier k.

Figure 2:
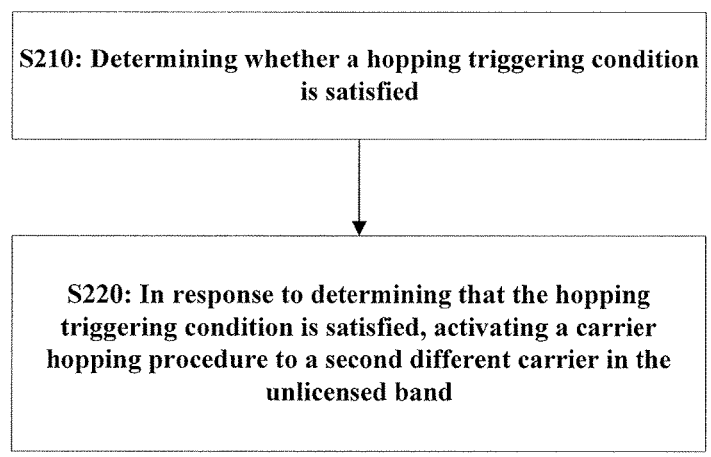
FIG. 2 illustrates an exemplary method of carrier hopping for an access node of a wireless communication network according to the first embodiment of the present disclosure.

FIG. 2 illustrates an exemplary and general method of carrier hopping for an access node of a wireless communication network according to the first embodiment of the present disclosure.

In the embodiment shown in FIG. 2, initially, the access node is operating on a first carrier in an unlicensed band, which means the access node operates without assistance of a licensed band. In other words, both control signal and data signal are transmitted on the first carrier.

At block S210, the access node determines whether a hopping triggering condition is satisfied. According to the first embodiment, the hopping may be triggered by some predefined-metric. The hopping triggering condition will be detailed with reference to FIG. 3 hereinafter.

Then, at block S220, in response to determining that the hopping triggering condition is satisfied, the access node activates a carrier hopping procedure to a second different carrier in the unlicensed band. As shown in FIG. 1, the carrier hopping procedure may include a transition period, during which the access node operates on both the first carrier and the second carrier. Via conditional slow enough carrier hopping with preconfigured parameters, a connected or idle communication device within the wireless communication network can be smoothly handed over to a different carrier and a new coming communication device can detect and access the network at service quest. The detailed procedure of the carrier hopping procedure will be described with reference to FIGS. 3 and 4 hereinafter.

Figure 3:
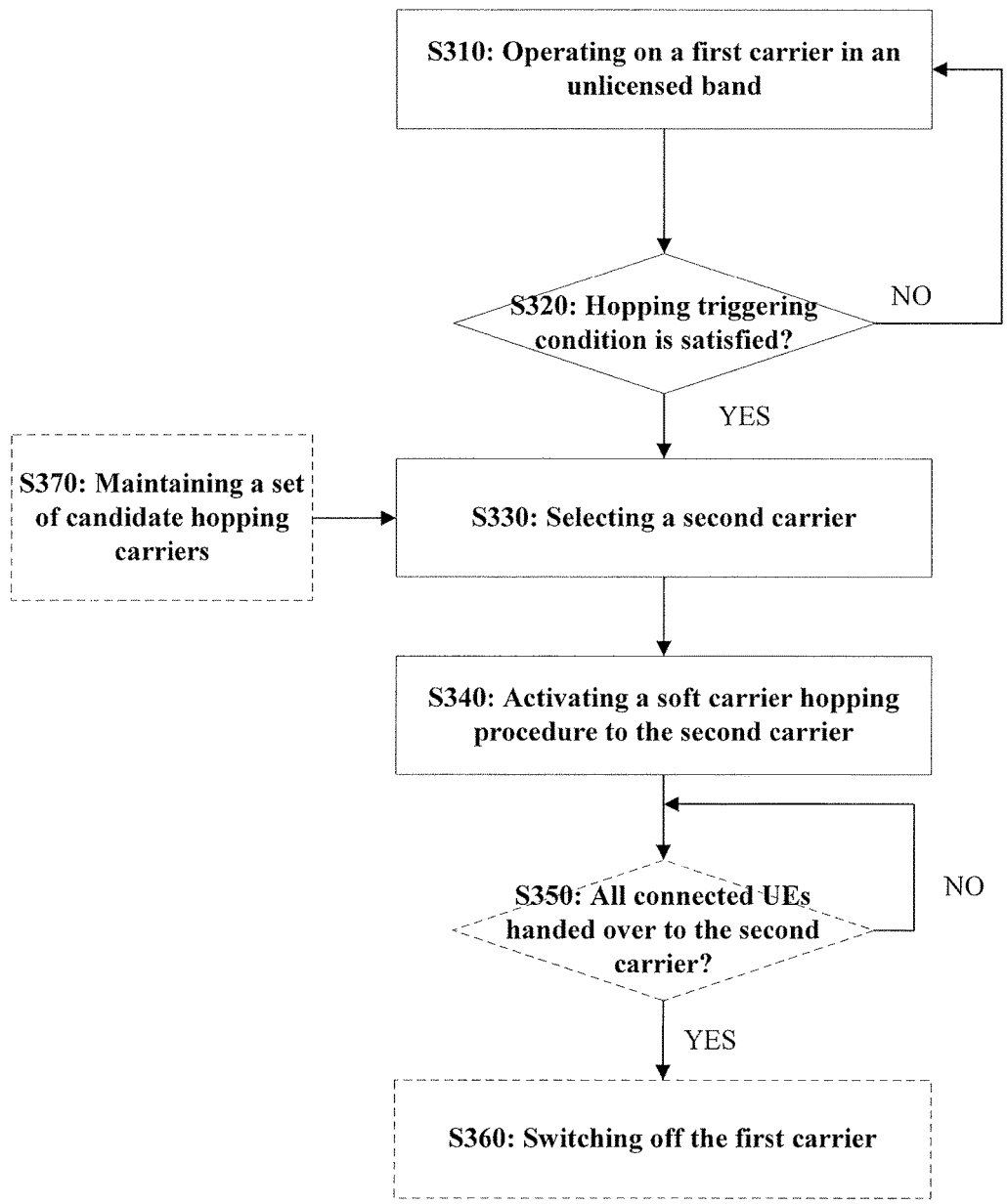
FIG. 3 illustrates a more detailed flowchart of a method of carrier hopping for an access node according to the first embodiment of the present disclosure.

FIG. 3 illustrates a more detailed flowchart of a method of carrier hopping for an access node of a wireless communication network according to the first embodiment of the present disclosure.

As shown in FIG. 3, the method starts at block S310 where the access node is operating on a first carrier in an unlicensed band, i.e., both control signal and data signal are transmitted on the first carrier.

At block S320, the access node determines whether a hopping triggering condition is satisfied. The hopping triggering condition may relate to load status of the current operating carrier, load status of other carrier or a candidate carrier, and/or channel quality of the operating carrier. More specifically, the hopping triggering condition may comprise one or more of the following: a traffic load caused by other access node on the first carrier exceeding a first threshold; a retransmission rate of the access node on the first carrier exceeding a rate threshold; and a traffic load caused by other access node on a second different carrier (i.e., next carrier to be hopped on, also referred to as next hop carrier hereafter) being lower than a second threshold and that the first carrier has been taken by the access node for a period longer than a time threshold. In one implementation, the access node could be an eNB of an LTE system, while other access node could be a WiFi AP or other eNB of the LTE system.

In one embodiment, the access node will mute some subframes periodically of the present channel/carrier (i.e. the first carrier in the present scenario) by not scheduling a communication device or configuring a connected communication device in discontinuous reception (DRX) state, in order to estimate the activities of other access node or system, such as other RBS or WiFi access point. During these muted subframes, measurement of a traffic load caused by other access node on the current operating carrier could be performed. In one implementation, the access node could perform the measurement. Alternatively or additionally, in another implementation, a communication device (e.g., a UE connected with the access node could perform the measurement and report the result to the access node. The measured traffic load could be compared with a first threshold to determine whether a carrier hopping should be triggered. If the measured traffic load exceeds the first threshold, which means that the present operating carrier is also being occupied by other access node and very busy, then a carrier hopping could be triggered.

In another embodiment, the access node could measure a retransmission rate of the access node on the current operating carrier. If the retransmission rate is higher than a rate threshold, which indicates that the current operating carrier is not suitable for transmission due to poor channel quality or strong interference caused by other access node or any other reason, then a carrier hopping could be triggered.

In yet another embodiment, the access node could measure a traffic load caused by other access node on a second different carrier (i.e., next hop carrier). If the traffic load on the second carrier is lower than a second threshold and the first carrier has been taken by the access node for a period longer than a time threshold, then a carrier hopping to the second carrier could be triggered. The time threshold can be set to ensure that there is enough time for a new coming communication device to access the operating carrier. Further, the time threshold may also prevent from too frequent hop, such as "ping-pang" effect.

The traffic load on a carrier as used herein means a traffic load caused by other access node on the carrier, which may include at least one of the following: an occupation time by other access node during a monitoring window of the carrier; and an average received power level from other access node during a monitoring window of the carrier.

It could be appreciated that, the traffic load could be represented by an absolute value of the occupation time or a relative value of the occupation time (e.g., the ratio of the occupation time to the length of the monitoring window). Similarly, the traffic load could be represented by an absolute value of the average received power level or a relative value of the average received power level (e.g., the ratio of the average received power level to the maximum allowable power level on the carrier). Those thresholds, such as the first threshold, the second threshold, can be set accordingly.

The above thresholds, i.e., the first threshold, the second threshold, the rate threshold, and the time threshold, are set to appropriate values, in order to ensure that an active period of each carrier shall be long enough so that a new coming communication device can complete the access procedure during the active period. Further, these thresholds can be set to ensure that there is no severe interference in an operating carrier and both e.g. LTE and WiFi systems can operate well and have good performance. It could be also appreciated that, the above triggering conditions can be applied separately or in combination.

Continuing with FIG. 3, if no hopping triggering condition is satisfied, the access node keeps operating on the first carrier. Otherwise, at block S330, the access node will select a second carrier as the next hop carrier.

In some embodiments, the carrier with the lowest traffic load is selected as the next hop carrier. Note that one carrier is selected for Time Division Duplex (TDD) systems and two for Frequency Division Duplex (FDD) system, where one for downlink and one for uplink.

Optionally, the method may further comprise maintaining a set of candidate hopping carriers at block S370. The next hop carrier can be selected from the set of candidate hopping carriers. In the set, the candidate hopping carriers may be chosen based on traffic loads on carriers in the unlicensed band.

In one embodiment, the access node can monitor traffic load of carriers other than the current operating carrier periodically in the unlicensed band. Taking the above example of a network including both LTE and WiFi as an example, the access node (i.e., an eNB) can be configured with a WiFi analyzer or a WiFi scanner. The WiFi analyzer or scanner can detect how many WiFi APs are around in each channel or carrier and measure the received signal power in each channel. Then the access node (i.e. the LTE eNB in this example) can determine the traffic load based on the received signal power. The channel is free and not occupied by other access node (i.e., a WiFi AP in this example) if the received power level is lower than a third threshold. Or the channel is busy and occupied by other access node if the received power level is higher than a fourth threshold. If the traffic load on a carrier is lower than the third threshold, the carrier can be added into the set of candidate hopping carriers. On the contrary, if the traffic load on a carrier within the set is higher than the fourth threshold, the carrier can be removed from the set.

Additionally or alternatively, the hopping set maintenance can also consider reports from a communication device. For example, the access node can also configure its connected communication devices to assist the monitoring of traffic load caused by other nodes, including nodes for WiFi, LTE and other access systems. For instance, a communication device can monitor the traffic load of certain carriers and report the carrier that has the lowest traffic load. Finally, the access node can determine a carrier to be added into or removed from the set of candidate hopping carriers based on the joint consideration of these reports form one or multiple communication devices and the measurement by the access node itself. For instance, the traffic load of a carrier from all the reports can be used as a metric to maintain the set of candidate hopping carriers.

Optionally, a maximum set size can be predetermined for the set of candidate hopping carriers. When there are enough candidate carriers in the set, the monitoring activities of the carriers other than the determined candidate carriers can be lower in order to save the monitoring overhead and power consumption. For example, the interval for monitoring of those carriers can become longer. Meanwhile the monitoring of the determined candidate carriers is continued as usual to ensure that the carriers in the set are good enough for use by the access node when needed.

Further optionally, the candidate carriers in the set of candidate hopping carriers can be ranked according to their respective traffic loads. For example, the candidate carriers may be ranked in priority descending order and the carrier with the highest priority is the next hop carrier for the access node. In principle, a candidate carrier with a lower traffic load can be assigned a higher priority.

Having selected a second carrier as the next hop carrier, at block S340, the access node activates a soft carrier hopping procedure to the second carrier. As mentioned previously, the soft carrier hopping procedure includes a transition period, during which the access node operates on both the first carrier and the second carrier. The transition period is long enough to ensure successful hopping from the first carrier to the second carrier for connected communication devices. The detailed operation during the transition period will be described later with reference to FIG. 4.

Then, at block S350, it is determined whether all connected communication devices have been handed over to the second carrier. If no, the access node may still operate on both the first carrier and the second carrier, i.e., the transition period is maintained. If all connected communication devices have been handed over to the second carrier, then at block S360, the access node can switch off the first carrier and operate only on the second carrier.

Figure 4:
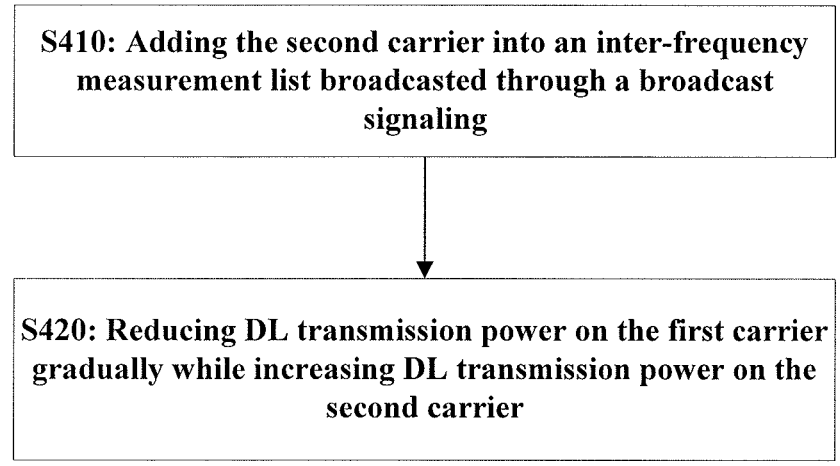
FIG. 4 illustrates an exemplary operation flow during the carrier hopping procedure according to the first embodiment of the present disclosure.

FIG. 4 illustrates an exemplary operation flow during the carrier hopping procedure according to the first embodiment of the present disclosure. In particular, FIG. 4 illustrates an exemplary operation flow during the carrier hopping procedure for a communication device in RRC_IDLE state.

As shown in FIG. 4, at block S410, the access node may add the next hop carrier (i.e., the second carrier) into an inter-frequency measurement list which will be broadcasted through a broadcast signaling such as system information block (SIB) message.

Then, at block S420, the access node may reduce downlink transmission power on the first carrier gradually while increasing downlink transmission power on the second carrier. For example, the downlink transmission power on the first carrier can be reduced until to zero, i.e., switch off the first carrier, meanwhile the downlink transmission power on the second carrier can be increased until to maximum. In such a way, communication devices in RRC_IDLE state can perform inter-frequency cell reselection based on existing rules as described previously.

For a communication device in RRC_CONNECTED state, the access node could inform it to hand over to the second carrier. In one embodiment, the access node will perform blind inter-frequency handover process without waiting for the measurement report from the communication device. For instance, the access node sends RRCConnectionReconfiguration message to each communication device in RRC_CONNECTED state. The message may include the identity and frequency of next hop carrier and radio resource information configuration. Note that there is no need for handover preparation between the current operating carrier (e.g. the first carrier) and the next hop carrier (e.g. the second carrier) when hopping is done in the access node.

For a new coming communication device, the access node can configure the operating carrier or cell as a barred carrier or cell in a broadcast signaling (e.g. SIB) or in a random access channel (RACH) response during the RACH procedure, etc, to indicate a new coming communication device not to select this carrier.

Alternatively, the access node can broadcast a carrier hopping command to all communication devices, either idle or connected. This command can be broadcasted repeatedly to ensure that the missing detection ratio is lower than a certain level. For example, this command can be implemented via a system information update procedure. Such command can include but not limited to, the next hop carrier. In this way, a communication device, either in idle state or in connected state, could obtain the information of next hop carrier and access the next hop carrier directly.

It could be also appreciated that, the above operations can be applied separately or in any combination as needed.

Depending on how the access node informs a communication device of the next hop carrier, the communication device could perform accordingly so as to communication with the access node on the next hop carrier.

Figure 5:
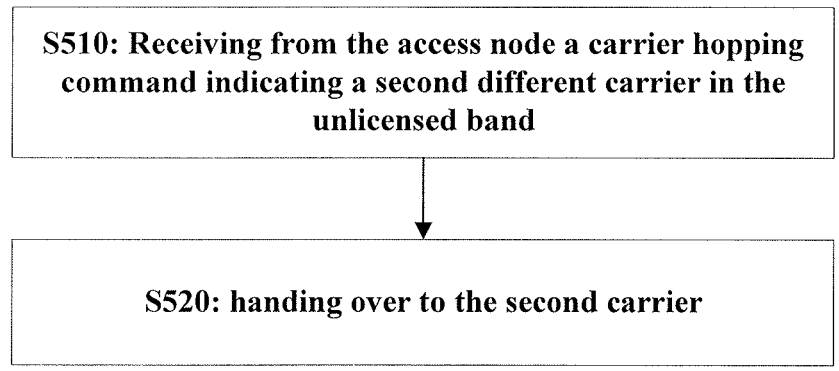
FIG. 5 illustrates an exemplary method for a communication device according to the first embodiment of the present disclosure.

FIG. 5 illustrates an exemplary method for a communication device of a wireless communication network according to the first embodiment of the present disclosure.

In the embodiment shown in FIG. 5, the communication device is communicating with an access node of the wireless communication network on a first carrier in an unlicensed band.

At block S510, the communication device receives from the access node a carrier hopping command indicating a second different carrier in the unlicensed band. In one embodiment, the carrier hopping command can be RRCConnectionReconfiguration message which indicates the communication device to hand over to the second carrier. In another embodiment, the communication device may be notified by a system information change indication message to re-read out the system information, such as, SIB, which includes the carrier hopping command.

Then, at block S520, as instructed by the carrier hopping command, the communication device hands over to the second carrier. Thereafter, the communication device could communicate with the access node on the second carrier.

Those skilled in the art could appreciate that, if the access node adopts the method as illustrated in FIG. 4 to inform a communication device of the next hop carrier, a communication devices in idle state could perform an inter-frequency cell reselection procedure so as to communication with the access node on the next hop carrier.

The above thus has described a slow soft carrier hopping mechanism over an unlicensed band. It can be seen that, only partial resource (e.g., the active period T1, T2, T3 as shown in FIG. 1) of each involved unlicensed carrier is taken by the wireless communication network such as LTE system, and once a hopping triggering condition is met, for example a WiFi node occupies the current operating carrier of an LTE eNB, the LTE eNB will hop to another carrier, and thus both LTE and WiFi can operate well. Further, the proposed slow soft carrier hopping will bring little change to e.g. current LTE protocol to achieve carrier hopping. For example, during the transition period, the access node (e.g., a RBS of an LTE system) could reuse existing procedures (e.g., handover, inter-frequency cell reselection) to achieve a smooth hop from the current operating carrier to the next hop carrier.

Figure 6:
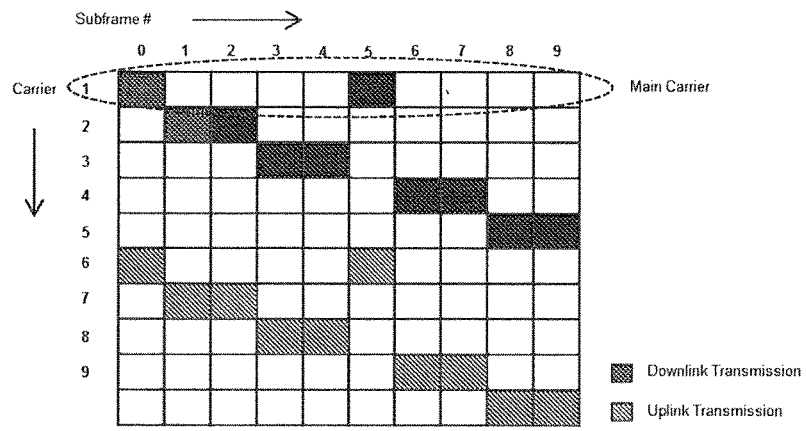
FIG. 6 illustrates a schematic diagram of a carrier hopping pattern according to a second embodiment of the present disclosure.

FIG. 6 illustrates a schematic diagram of a carrier hopping pattern according to a second embodiment of the present disclosure. In this second embodiment, a pattern-based fast carrier hopping mechanism is provided.

As shown in FIG. 6, the horizontal axis represents time resource in units of subframe, and the vertical axis represents frequency resource denoted by carrier in an unlicensed band. The resource segments, i.e., one or more subframes over different unlicensed carriers are aggregated to form a virtual carrier. In other words, the virtual carrier is consisted of multiple carriers in the unlicensed band that are arranged in a consecutive and non-overlapping manner in time. That is, during active period of each involved unlicensed carrier, only one carrier is used for uplink or downlink transmission, which is different from the transition period of the slow soft carrier hopping according to the first embodiment of the present disclosure.

In carrier hopping, the carrier hopping pattern is repeated periodically and the virtual carrier is formulated by periodically short occupations over multiple carriers. In the example shown in FIG. 6, the period for repeating the carrier hopping pattern is one radio frame consisted of 10 subframes. The skilled in the art could appreciate that other longer or shorter period may also be used to define the carrier hopping pattern.

The example in FIG. 6 is illustrated for an LTE FDD system, and thus there are an uplink virtual carrier for uplink transmission and a downlink virtual carrier for downlink transmission. For example, in the arrangement of the downlink virtual carrier, subframe #0 is transmitted on Carrier 1, subframe #1 and #2 are transmitted on Carrier 2, subframe #3 and #4 are transmitted on Carrier 3, subframe #5 is transmitted on Carrier 1, subframe #6 and #7 are transmitted on Carrier 4, and subframe #8 and #9 are transmitted on Carrier 5. Similarly, in the arrangement of the uplink virtual carrier, subframe #0 is transmitted on Carrier 6, subframe #1 and #2 are transmitted on Carrier 7, subframe #3 and #4 are transmitted on Carrier 8, subframe #5 is transmitted on Carrier 6, subframe #6 and #7 are transmitted on Carrier 9, and subframe #8 and #9 are transmitted on Carrier 10. It is seen that different subframes may be located in different carriers but form into a virtual carrier with continual transmission or reception.

In further embodiments, the multiple carriers in the carrier hopping pattern may include at least a main carrier and a secondary carrier. The main carrier may be configured for carrying first information for a communication device to access the wireless communication network over the virtual carrier and second information about the carrier hopping pattern. For example, the first information may include synchronization signals and the second information may be carried on master information block (MIB) or system information block (SIB). The subframes that carry synchronization signals and/or the subframes that carry MIB or SIB (referred to as mandatory subframes) shall be transmitted on the main carrier. In the example shown in FIG. 6, because synchronization signals are transmitted in subframe #0 and #5 for an LTE FDD system, the main carrier is Carrier 1. For an LTE TDD system, the mandatory subframes could be subframe #1 and #6. Then, a communication device could search and detect the main carrier via the synchronization signals and in turn read MIB information on the main carrier. The virtual carrier can be sectorized and assigned cell identification (ID) similarly to a cell over a single carrier. For example, the cell ID could be included in the synchronization signals.

From the carrier hopping pattern, it can be seen that the active period for each involved unlicensed carrier is very short, and the number of involved unlicensed carriers may be more than 10. Due to such a fast hopping, the impact from e.g. the access node in an LTE system to a WiFi system can be averaged into multiple carriers and the WiFi system may have no feeling of impact from the LTE system. Further, since the carrier hopping pattern can be treated as a virtual carrier with continual transmission and/or reception which is similar to one FDD or TDD channel, some existing procedures scheduled on the basis of subframe, such as random access, hybrid automatic request retransmission (HARQ) timing, and scheduling timing, etc. can be reused for the virtual carrier.

Figure 7:
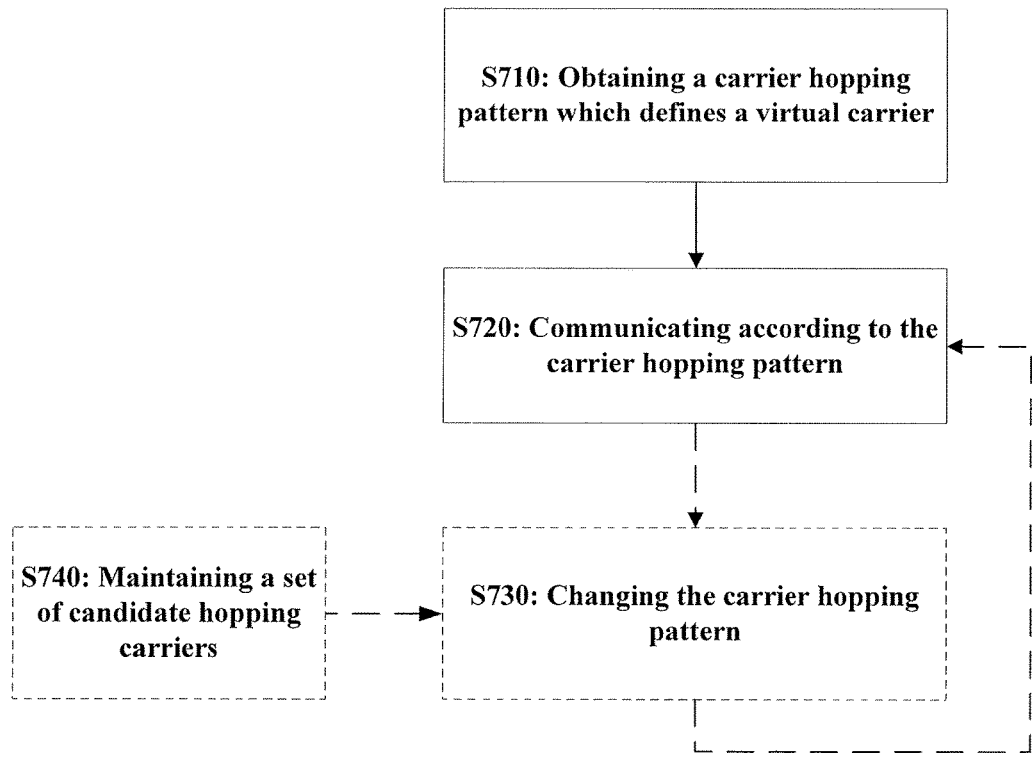
FIG. 7 illustrates a flowchart of a method of carrier hopping according to the second embodiment of the present disclosure.

FIG. 7 illustrates a flowchart of a method of carrier hopping for an access node of a wireless communication network according to the second embodiment of the present disclosure.

As shown in FIG. 7, at block S710, the access node obtains a carrier hopping pattern which defines a virtual carrier. The virtual carrier is consisted of multiple carriers in an unlicensed band that are arranged in a consecutive and non-overlapping manner in time. The virtual carrier can be configured according to the description with reference to FIG. 6. For example, the multiple carriers may include at least a main carrier and a secondary carrier. The main carrier may be configured for carrying first information for a communication device to access the wireless communication network over the virtual carrier and second information about the carrier hopping patter. In the carrier hopping pattern, each of the multiple carriers may be arranged in units of subframe. Taking the carrier hopping pattern shown in FIG. 6 as an example, the occupation of the main carrier (i.e., Carrier 1) is one subframe, while the occupations of the secondary carriers (i.e., Carrier 2-10) is either one subframe or two subframes.

In one embodiment, the carrier hopping pattern may be determined by the access node. The access node can select hopping carriers based on traffic load on carriers in the unlicensed band so as to form a virtual carrier. As described with reference to FIG. 3, the access node could optionally maintain a set of candidate hopping carriers. Thus, the access node could select carriers from the set to form the virtual carrier. The maintaining of the set can be similar to that in the slow soft carrier hopping mechanism according to the first embodiment, and thus the description thereof is omitted here.

In another embodiment, one or more carrier hopping patterns may be hardcoded in the access node, for example, defined in a standard document. Then, the access node can select or specify one as the carrier hopping pattern to be used, partly based on traffic load on carriers within the carrier hopping patterns.

Then, at block S720, the access node communicates with a communication device of the wireless communication network according to the obtained carrier hopping pattern. Specifically, in different subframes, the access node performs transmission or reception in different carriers according to the carrier hopping pattern.

Optionally, at block S730, the access node may change the currently used carrier hopping pattern into a target carrier hopping pattern. The access node may track the carrier status (e.g., traffic load caused by other access node, such as a node for a WiFi system or hopping pattern of other LTE system) and change the carrier hopping pattern dynamically (e.g., every 80 ms) according to the situation of the carriers (busy or free). In some embodiments, the changing may be triggered by some conditions which may be similar to those hopping triggering conditions as described in slow soft carrier hopping mechanism according to the first embodiment of the present disclosure. For example, in response that a traffic load caused by other access node on a secondary carrier exceeds a certain threshold, the current carrier hopping pattern can be quickly switched to a target carrier hopping pattern in which this secondary carrier can be replaced by another carrier.

In one embodiment, the main carrier is kept unchanged between the current carrier hopping pattern and a target carrier hopping pattern. In this way, a new coming or idle communication device can find this virtual carrier to make synchronization and get system information.

In another embodiment, in a target carrier hopping pattern, the main carrier can be changed to a target main carrier slowly, i.e., via a transition period. That is, with respect to the main carrier, the previous described slow soft carrier hopping mechanism can be used. During the transition period, the access node transmits the first information and the second information on both the main carrier and the target main carrier.

Hereinafter, the method can go back to block S720, where the access node communicates with the communication device according to the changed carrier hopping pattern.

Figure 8:
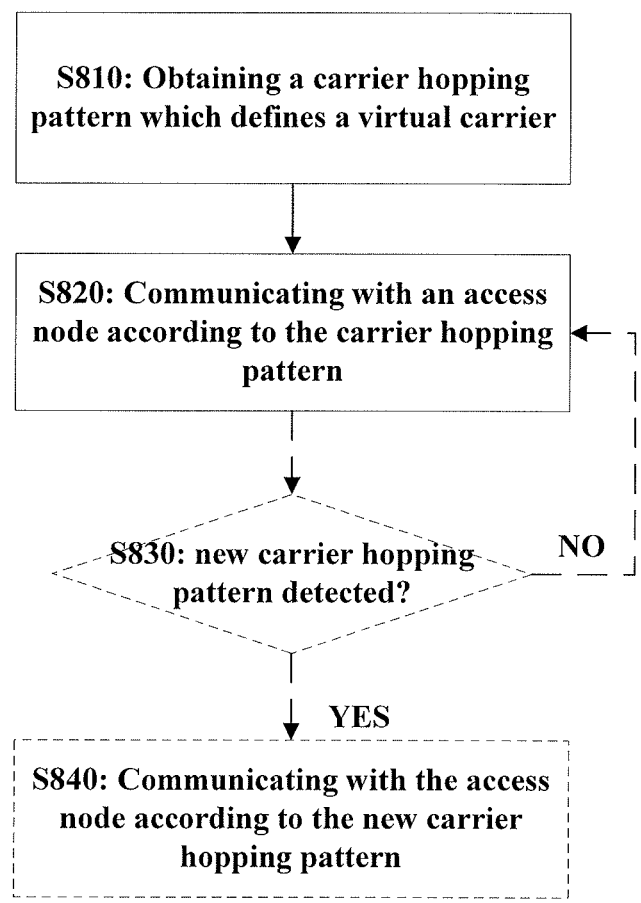
FIG. 8 illustrates an exemplary method for a communication device according to the second embodiment of the present disclosure.

FIG. 8 illustrates an exemplary method for a communication device of a wireless communication network according to the second embodiment of the present disclosure.

As shown in FIG. 8, at block S810, the communication device obtains a carrier hopping pattern which defines a virtual carrier. The virtual carrier is consisted of multiple carriers in an unlicensed band that are arranged in a consecutive and non-overlapping manner in time. The multiple carriers may include at least a main carrier and a secondary carrier. The main carrier may be configured for carrying first information for a communication device to access the wireless communication network over the virtual carrier and second information about the carrier hopping patter. In the carrier hopping pattern, each of the multiple carriers may be arranged in units of subframe.

In one embodiment, the carrier hopping pattern may be received from an access node of the wireless communication network. For example, the access node can broadcast the carrier hopping pattern via MIB or SIB to let a communication device know which carrier should be used in which corresponding subframe.

In another embodiment, one or more carrier hopping patterns may be hardcoded in the communication device, for example, defined in a standard document. Then, a default carrier hopping pattern or a specified one informed by an access node could be obtained.

Then, at block S820, the communication device communicates with the access node of the wireless communication network according to the obtained carrier hopping pattern. Specifically, in different subframes, the communication device performs transmission or reception in different carriers according to the carrier hopping pattern.

Optionally, at block S830, the communication device may detect whether there is any new carrier hopping pattern. For example, the communication device can receive system information transmitted on the main carrier, which including the information of a possible new carrier hopping pattern. If a new carrier hopping pattern is detected, then at block S840, the communication device can communicate with the access node according to the new carrier hopping pattern. Otherwise, the communication device still uses the current carrier hopping pattern to communicate with the access node.

The above thus has described a fast carrier hopping pattern-based mechanism over an unlicensed band. It can be seen that, only partial resource (e.g., the shadowed grids as shown in FIG. 6) of each involved unlicensed carrier is taken by the wireless communication network such as LTE system, and thus both LTE and WiFi can operate well. Further, in such a fast hopping pattern, the impact from e.g. the access node in an LTE system to a WiFi system can be averaged into multiple carriers and the WiFi system may have no feeling of impact from the LTE system. Thus, the carrier hopping pattern generally can be kept unchanged for a long time. On the other hand, since the carrier hopping pattern is arranged in units of subframe, some existing procedures scheduled on the basis of subframe, such as random access, hybrid automatic request retransmission (HARQ) timing, and scheduling timing, etc. can be reused for the virtual carrier.

Figure 9:
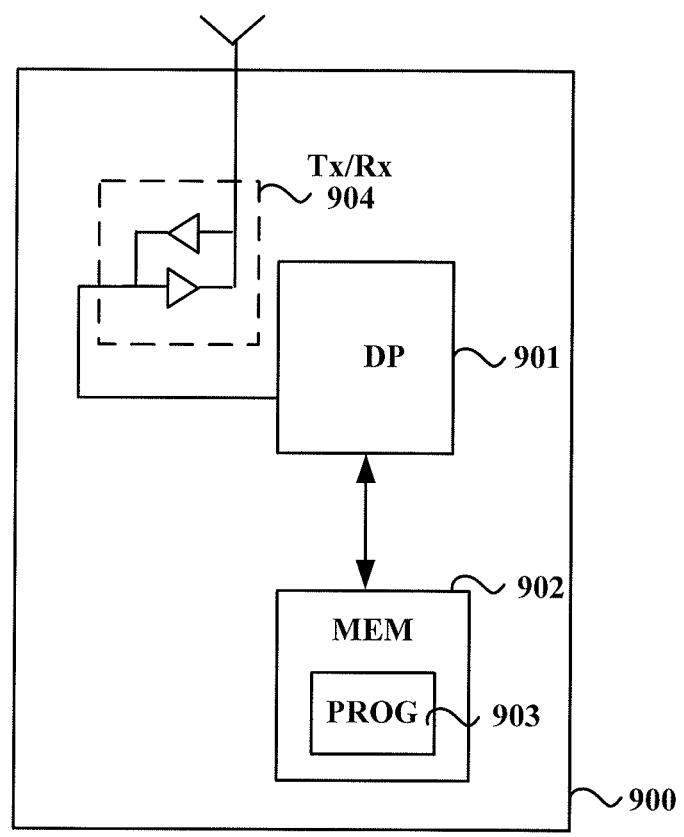
FIG. 9 illustrates a simplified block diagram of an apparatus that is suitable for use in practicing exemplary embodiments of the present disclosure.

FIG. 9 illustrates a simplified block diagram of an apparatus 900 that is suitable for use in practicing exemplary embodiments of the present disclosure. In some embodiments, the apparatus 900 may be configured as an access node, while in some other embodiments, the apparatus 900 may be configured as a communication device.

As shown in FIG. 9, the apparatus 900 includes a data processor (DP) 901, a memory (MEM) 902 coupled to the DP 901, and a suitable radio frequency (RF) transmitter TX and receiver RX 904 coupled to the DP 901. The MEM 902 stores a program (PROG) 903. The TX/RX 904 is for bidirectional wireless communications. Note that the TX/RX 904 has at least one antenna to facilitate communication, though in practice an access node such as a radio base station or a communication device such as a user equipment may have several ones. The apparatus 900 may be coupled via a data path to one or more external networks or systems, such as the internet, for example.

The PROG 903 is assumed to include program instructions that, when executed by the associated DP 901, enable the apparatus 900 to operate in accordance with the exemplary embodiments of this disclosure, as discussed herein with the methods in FIGS. 2-5 and 7-8. In some embodiments, when the apparatus 900 is configured as an access node, the memory of the access node contains instructions executable by the DP of the access node whereby the access node is operative to perform the method steps as illustrated in FIGS. 2-5. In some other embodiments, when the apparatus 900 is configured as a communication device, the memory of the communication device contains instructions executable by the DP of the communication device whereby the communication device is operative to perform the method steps as illustrated in FIGS. 7-8.

The embodiments of the present disclosure may be implemented by computer software executable by the DP 901 of the apparatus 900, or by hardware, or by a combination of software and hardware.

The MEM 902 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 900, there may be several physically distinct memory units in the apparatus 900. The DP 901 may be of any type suitable to the local technical environment, and may include one or more of general purpose computers, special purpose computers, microprocessors, digital signal processors (DSPs) and processors based on multi-core processor architecture, as non limiting examples. The apparatus 900 may have multiple processors, such as for example an application specific integrated circuit chip that is slaved in time to a clock which synchronizes the main processor.

FIG. 10 is a schematic block diagram of an access node 1000 of a wireless communication network that may be configured to practice exemplary embodiments according to the first embodiment of the present disclosure.

As shown in FIG. 10, the access node 1000 includes a determining module 1010 and an activating module 1020. Optionally, the access node 1000 may further include a maintaining module 1030.

In some embodiments, the access node 1000 operates on a first carrier in an unlicensed band. The determining module 1010 is configured to determine whether a hopping triggering condition is satisfied. The activating module 1020 is configured to, in response to determining that the hopping triggering condition is satisfied, activate a carrier hopping procedure to a second different carrier in the unlicensed band.

In some embodiments, the carrier hopping procedure may include a transition period, during which the access node 1000 operates on both the first carrier and the second carrier.

According to some embodiments, the hopping triggering condition may comprise one or more of the following: a traffic load caused by other access node on the first carrier exceeding a first threshold; a retransmission rate of the access node on the first carrier exceeding a rate threshold; and a traffic load caused by other access node on the second carrier being lower than a second threshold and that the first carrier has been taken by the access node for a period longer than a time threshold.

According to some embodiments, the activating module 1020 may be configured to perform at least one of, during the transition period: informing a connected communication device to hand over to the second carrier; adding the second carrier into an inter-frequency measurement list broadcasted through a broadcast signaling, and reducing downlink transmission power on the first carrier gradually while increasing downlink transmission power on the second carrier; and configuring the first carrier as a barred carrier to indicate a new coming communication device not to select the first carrier.

Alternatively, in some embodiments, the activating module 1020 may be configured to, during the transition period, broadcast a carrier hopping command indicating the second carrier.

The maintaining module 1030 may be configured to maintain a set of candidate hopping carriers from which the second carrier is selected. The candidate hopping carriers are chosen based on traffic loads on carriers in the unlicensed band.

In further embodiments, the maintaining module 1030 may be configured to maintain the set by one or more of the following: adding a carrier into the set if the traffic load on the carrier is lower than a third threshold; removing a carrier from the set if the traffic load on the carrier is higher than a fourth threshold; and ranking carriers in the set according to their respective traffic loads.

In some embodiments, the traffic load on a carrier may include at least one of the following: an occupation time by other access node during a monitoring window of the carrier; and an average received power level from other access node during a monitoring window of the carrier.

In some embodiments, the access node 1000 may be a radio base station of a long term evolution, LTE, system.

It should be understood, the modules 1010-1030 contained in the access node 1000 may be configured for practicing the first embodiment of the present disclosure. Thus, the operations and features described above with respect to FIGS. 2-3 also apply to the access node 1000 and the modules therein, and the detailed description thereof is omitted here.

FIG. 11 is a schematic block diagram of an access node 1100 of a wireless communication network that may be configured to practice exemplary embodiments according to the second embodiment of the present disclosure.

As shown in FIG. 11, the access node 1100 includes an obtaining module 1110 and a communication module 1120. Optionally, the access node 1100 may further include a maintaining module 1130 and a changing module 1140.

The obtaining module 1110 is configured to obtain a carrier hopping pattern which defines a virtual carrier consisted of multiple carriers in an unlicensed band that are arranged in a consecutive and non-overlapping manner in time.

The communication module 1120 is configured to communicate with a communication device of the wireless communication network according to the carrier hopping pattern.

In some embodiments, the multiple carriers may include at least a main carrier and a secondary carrier, the main carrier being configured for carrying first information for a communication device to access the wireless communication network over the virtual carrier and second information about the carrier hopping pattern.

In some further embodiments, in the carrier hopping pattern, each of the multiple carriers may be arranged in units of subframe.

The maintaining module 1130 may be configured to maintain a set of candidate hopping carriers from which the multiple carriers of the virtual carrier are selected. The candidate hopping carriers are chosen based on traffic loads on carriers in the unlicensed band.

In some embodiments, the changing module 1140 may be configured to change the carrier hopping pattern, wherein the main carrier is kept unchanged, or the main carrier is changed to a target carrier via a transition period, during which the access node transmits the first information and the second information on both the main carrier and the target carrier.

In some embodiments, the access node 1100 may be a radio base station of a long term evolution, LTE, system.

It should be understood, the modules 1110-1140 contained in the access node 1100 may be configured for practicing the second embodiment of the present disclosure. Thus, the operations and features described above with respect to FIG. 7 also apply to the access node 1100 and the modules therein, and the detailed description thereof is omitted here.

In should be noted that FIGS. 10-11 merely illustrates various functional modules in the access nodes 1000 and 1100 in a logical sense. The functions in practice may be implemented using any suitable software and hardware means/circuits etc. Thus, the embodiments are generally not limited to the shown structures of the access nodes 1000 and 1100 and the functional modules. Hence, the previously described exemplary embodiments may be realized in many ways. For example, one embodiment includes a computer-readable medium having instructions stored thereon that are executable by the control or processing unit for executing the method steps in the access nodes 1000 or 1100. The instructions executable by the computing system and stored on the computer-readable medium perform the method steps of the access node 1000 or 1100 as set forth previously.

FIG. 12 is a schematic block diagram of a communication device 1200 of a wireless communication network that may be configured to practice exemplary embodiments according to the first embodiment of the present disclosure.

As shown in FIG. 12, the communication device 1200 includes a receiving module 1210 and a handover module 1220.

In some embodiments, the communication device 1200 communicates with an access node of the wireless communication network on a first carrier in an unlicensed band. The receiving module 1210 is configured to receive from the access node a carrier hopping command indicating a second different carrier in said unlicensed band; and the handover module 1220 is configured to hand the communication device 1200 over to the second carrier.

In some embodiments, the communication device 1200 may be a user equipment of the LTE system.

It should be understood, the modules 1210-1220 contained in the communication device 1200 may be configured for practicing the first embodiment of the present disclosure. Thus, the operations and features described above with respect to FIG. 4 also apply to the communication device 1200 and the modules therein, and the detailed description thereof is omitted here.

FIG. 13 is a schematic block diagram of a communication device 1300 of a wireless communication network that may be configured to practice exemplary embodiments according to the second embodiment of the present disclosure.

As shown in FIG. 13, the communication device 1300 comprises an obtaining module 1310 and a communication module 1320. Optionally, the communication device 1300 may further comprise a detecting module 1330.

The obtaining module 1310 is configured to obtain a carrier hopping pattern which defines a virtual carrier consisted of multiple carriers in an unlicensed band that are arranged in a consecutive and non-overlapping manner in time. The communication module 1320 is configured to communicate with an access node of the wireless communication network according to the carrier hopping pattern.

In some embodiments, the multiple carriers may include at least a main carrier and a secondary carrier, the main carrier being configured for carrying first information for a communication device to access the wireless communication network over the virtual carrier and second information about the carrier hopping pattern.

In some further embodiments, in the carrier hopping pattern, each of the multiple carriers may be arranged in units of subframe.

In some embodiments, the detecting module 1330 may be configured to detect a new carrier hopping pattern. In such embodiments, the communication module 1320 may be configured to communicate with the access node according to the new carrier hopping pattern.

In some embodiments, the communication device 1300 may be a user equipment of the LTE system.

It should be understood, the modules 1310-1330 contained in the communication device 1300 may be configured for practicing the second embodiment of the present disclosure. Thus, the operations and features described above with respect to FIG. 7 also apply to the communication device 1300 and the modules therein, and the detailed description thereof is omitted here.

In should be noted that FIGS. 12-13 merely illustrates various functional modules in the communication devices 1200 and 1300 in a logical sense. The functions in practice may be implemented using any suitable software and hardware means/circuits etc. Thus, the embodiments are generally not limited to the shown structures of the communication devices 1200 and 1300 and the functional modules. Hence, the previously described exemplary embodiments may be realized in many ways. For example, one embodiment includes a computer-readable medium having instructions stored thereon that are executable by the control or processing unit for executing the method steps in the communication devices 1200 or 1300. The instructions executable by the computing system and stored on the computer-readable medium perform the method steps of the communication devices 1200 or 1300 as set forth previously.

Exemplary embodiments of the present disclosure have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the disclosure comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims. In addition, any of the reference numerals in the claims should not be interpreted as a limitation to the claims. Use of the verb "comprise" or "include" and its conjugations does not exclude the presence of elements or steps other than those stated in a claim. The indefinite article "a" or "an" preceding an element or step does not exclude the presence of a plurality of such elements or steps.

What is claimed is:

1. A method of carrier hopping for an access node of a wireless communication network, wherein the access node operates on a first carrier in an unlicensed band, the method comprising:

determining whether a hopping triggering condition is satisfied; and in response to determining that the hopping triggering condition is satisfied, activating a carrier hopping procedure to a second different carrier in the unlicensed band, wherein:

the carrier hopping procedure includes a transition period during which the access node performs downlink operations on both the first carrier and the second different carrier; and the carrier hopping procedure comprises, during the transition period:

informing a connected communication device to hand over to the second different carrier;

adding the second different carrier into an interfrequency measurement list broadcasted through a broadcast signaling, and reducing downlink transmission power on the first carrier gradually while increasing downlink transmission power on the second different carrier; and configuring the first carrier as a barred carrier to indicate a new coming communication device not to select the first carrier.

2. The method of claim 1, wherein the carrier hopping procedure comprises, during the transition period:

broadcasting a carrier hopping command indicating the second different carrier.

3. The method of claim 1, wherein the hopping triggering condition comprises one or more of the following:

a traffic load caused by other access node on the first carrier exceeding a first threshold;

a retransmission rate of the access node on the first carrier exceeding a rate threshold; and a traffic load caused by other access node on the second different carrier being lower than a second threshold and that the first carrier has been taken by the access node for a period longer than a time threshold.

4. The method of claim 3, wherein the traffic load on a carrier includes at least one of the following:

an occupation time by other access node during a monitoring window of the carrier; and an average received power level from other access node during a monitoring window of the carrier.

5. The method of claim 1, further comprising:

maintaining a set of candidate hopping carriers from which the second different carrier is selected, wherein the candidate hopping carriers are chosen based on traffic loads on carriers in the unlicensed band.

6. The method of claim 5, wherein maintaining the set of candidate hopping carriers comprises one or more of the following:

adding a carrier into the set of candidate hopping carriers if the traffic load on the carrier is lower than a third threshold;

removing a carrier from the set of candidate hopping carriers if the traffic load on the carrier is higher than a fourth threshold; and ranking carriers in the set of candidate hopping carriers according to their respective traffic loads.

7. The method of claim 1, wherein the access node is a radio base station of a long term evolution, LTE, system.

8. A method of carrier hopping for an access node of a wireless communication network, the method comprising:

obtaining a carrier hopping pattern which defines a virtual carrier comprising multiple carriers in an unlicensed band that are arranged in a contiguous, consecutive and non-overlapping manner in time, wherein the multiple carriers include at least a main carrier and a secondary carrier, the main carrier being configured for carrying both first information for a communication device to access the wireless communication network over the virtual carrier and second information about the carrier hopping pattern; and communicating with the communication device of the wireless communication network according to the carrier hopping pattern.

9. The method of claim 8, wherein in the carrier hopping pattern, each of the multiple carriers is arranged in units of subframe.

10. The method of claim 8, further comprising changing the carrier hopping pattern to a target carrier hopping pattern, wherein:

the main carrier is kept unchanged in the target carrier hopping pattern; or the main carrier is changed to a target carrier of the target carrier hopping pattern via a transition period, during which the access node transmits the first information and the second information on both the main carrier and the target carrier.

11. A method of carrier hopping for a communication device of a wireless communication network, wherein the communication device communicates with an access node of the wireless communication network on a first carrier in an unlicensed band, the method comprising:

obtaining a carrier hopping pattern which defines a virtual carrier comprising multiple carriers in an unlicensed band that are arranged in a contiguous, consecutive and non-overlapping manner in time, wherein:

in the carrier hopping pattern, each of the multiple carriers is arranged in units of subframe; and the multiple carriers include at least a main carrier and a secondary carrier, the main carrier being configured for carrying both first information for the communication device to access the wireless communication network over the virtual carrier and second information about the carrier hopping pattern;

receiving from the access node a carrier hopping command indicating a second different carrier in the unlicensed band; and handing over to the second different carrier.

12. The method of claim 11, wherein the access node is a radio base station of a long term evolution, LTE, system, and the communication device is a user equipment of the LTE system.

13. A method of carrier hopping for a communication device of a wireless communication network, the method comprising:

obtaining a carrier hopping pattern which defines a virtual carrier comprising multiple carriers in an unlicensed band that are arranged in a contiguous, consecutive and non-overlapping manner in time, wherein the multiple carriers include at least a main carrier and a secondary carrier, the main carrier being configured for carrying both first information for the communication device to access the wireless communication network over the virtual carrier and second information about the carrier hopping pattern; and communicating with an access node of the wireless communication network according to the carrier hopping pattern.

14. The method of claim 13, wherein in the carrier hopping pattern, each of the multiple carriers is arranged in units of subframe.

15. The method of claim 13, further comprising:
detecting a new carrier hopping pattern; and
communicating with the access node according to the new carrier hopping pattern.

16. An access node of a wireless communication network, wherein the access node operates on a first carrier in an unlicensed band, the access node comprising:
a processor, and
a memory, the memory containing instructions executable by the processor whereby the access node is configured to:
determine whether a hopping triggering condition is satisfied; and
in response to determining that the hopping triggering condition is satisfied, activate a carrier hopping procedure to a second different carrier in the unlicensed band, wherein the carrier hopping procedure includes a transition period during which the access node performs downlink operations on both the first carrier and the second different carrier; and
perform, during the transition period:
informing a connected communication device to hand over to the second different carrier;
adding the second different carrier into an inter-frequency measurement list broadcasted through a broadcast signaling, and reducing downlink transmission power on the first carrier gradually while increasing downlink transmission power on the second different carrier; and
configuring the first carrier as a barred carrier to indicate a new coming communication device not to select the first carrier.

17. The access node of claim 16, wherein the memory further contains instructions executable by the processor whereby the access node is configured to, during the transition period:
broadcast a carrier hopping command indicating the second different carrier.

18. The access node of claim 16, wherein the hopping triggering condition comprises one or more of the following:
a traffic load caused by other access node on the first carrier exceeding a first threshold;
a retransmission rate of the access node on the first carrier exceeding a rate threshold; and
a traffic load caused by other access node on the second different carrier being lower than a second threshold and that the first carrier has been taken by the access node for a period longer than a time threshold.

19. The access node of claim 18, wherein the traffic load on a carrier includes at least one of the following:
an occupation time by other access node during a monitoring window of the carrier; and
an average received power level from other access node during a monitoring window of the carrier.

20. The access node of claim 16, wherein the access node is a radio base station of a long term evolution, LTE, system.

21. An access node of a wireless communication network, the access node comprising:
a processor, and
a memory, the memory containing instructions executable by the processor whereby the access node is configured to:
obtain a carrier hopping pattern which defines a virtual carrier comprising multiple carriers in an unlicensed band that are arranged in a contiguous, consecutive and non-overlapping manner in time, wherein the multiple carriers include at least a main carrier and a secondary carrier, the main carrier being configured for carrying both first information for a communication device to access the wireless communication network over the virtual carrier and second information about the carrier hopping pattern; and
communicate with the communication device of the wireless communication network according to the carrier hopping pattern.

22. The access node of claim 21, wherein in the carrier hopping pattern, each of the multiple carriers is arranged in units of subframe.

23. The access node of claim 21, wherein the memory further contains instructions executable by the processor whereby the access node is configured to change the carrier hopping pattern, wherein the main carrier is kept unchanged, or the main carrier is changed to a target carrier via a transition period, during which the access node transmits the first information and the second information on both the main carrier and the target carrier.

24. A communication device of a wireless communication network, wherein the communication device communicates with an access node of the wireless communication network on a first carrier in an unlicensed band, the communication device comprising:
a processor, and
a memory, the memory containing instructions executable by the processor whereby the communication device is configured to:
obtain a carrier hopping pattern which defines a virtual carrier comprising multiple carriers in an unlicensed band that are arranged in a contiguous, consecutive and non-overlapping manner in time, wherein:
in the carrier hopping pattern, each of the multiple carriers is arranged in units of subframe; and
the multiple carriers include at least a main carrier and a secondary carrier, the main carrier being configured for carrying both first information for the communication device to access the wireless communication network over the virtual carrier and second information about the carrier hopping pattern;
receive from the access node a carrier hopping command indicating a second different carrier in the unlicensed band; and
hand over to the second different carrier.

25. The communication device of claim 24, wherein the communication device is a user equipment of a long term evolution, LTE, system.

26. A communication device of a wireless communication network, the communication device comprising:
a processor, and
a memory, the memory containing instructions executable by the processor whereby the communication device is configured to:
obtain a carrier hopping pattern which defines a virtual carrier comprising multiple carriers in an unlicensed band that are arranged in a contiguous, consecutive and non-overlapping manner in time, wherein the multiple carriers include at least a main carrier and a secondary carrier, the main carrier being configured for carrying both first information for the communication device to access the wireless communication network over the virtual carrier and second information about the carrier hopping pattern; and
communicate with an access node of the wireless communication network according to the carrier hopping pattern.

27. The communication device of claim 26, wherein in the carrier hopping pattern, each of the multiple carriers is arranged in units of subframe.

28. The communication device of claim 26, wherein the memory further contains instructions executable by the processor whereby the communication device is configured to:
   detect a new carrier hopping pattern; and
   communicate with the access node according to the new carrier hopping pattern.

* * * * *